United States Patent [19]

Durkan

[11] 3,714,828
[45] Feb. 6, 1973

[54] FLUIDIC DIGITAL PNEUMOTACHOMETER

[76] Inventor: Gerald Durkan, 6 Emerson Street, Uniontown, Pa.

[22] Filed: Oct. 26, 1970

[21] Appl. No.: 83,885

[52] U.S. Cl. ............... 73/194 R, 73/DIG. 8, 137/81.5
[51] Int. Cl. ................................................. G01f 1/00
[58] Field of Search .... 73/194 R, 505, 515, 388, 521, 73/32, 194 C, DIG. 8; 137/81.5

[56] References Cited

UNITED STATES PATENTS

| | | | |
|---|---|---|---|
| 3,557,815 | 1/1971 | Lazar | 137/81.5 |
| 3,604,443 | 9/1971 | Davis | 137/81.5 |
| 3,605,778 | 9/1971 | Metzger | 137/81.5 |
| 3,216,439 | 11/1965 | Manion | 73/194 C |
| 3,238,960 | 3/1966 | Hatch, Jr. | 137/81.5 |
| 3,273,377 | 9/1966 | Testerman et al. | 73/23.1 |
| 3,276,464 | 10/1966 | Metzger | 73/515 X |
| 3,373,600 | 3/1968 | Taplin | 73/32 |
| 3,411,354 | 11/1968 | Josephson | 73/194 R X |
| 3,442,124 | 5/1969 | Warren et al. | 73/194 R |
| 3,529,613 | 9/1970 | Neradka | 73/515 X |

*Primary Examiner*—Charles A. Ruehl
*Attorney*—Benjamin F. Griffin, Jr., Alan E. J. Branigon and Gary S. Kindness

[57] ABSTRACT

A device for measuring fluid flow comprises a fluid oscillator including a feedback path whose RC time constant may be varied in response to the flow being measured, such that the frequency of oscillation is proportional to the rate of flow. A proportional fluid amplifier has a power stream input and one output connected in the feedback path of a NOR-type oscillator, and the flow being measured is applied as a control input signal to the amplifier to effectively vary the RC time constant of the feedback path. The oscillator produces fluid output pulses at a rate proportional to the flow being measured, and these pulses are counted to provide a digital indication of the flow rate.

8 Claims, 5 Drawing Figures

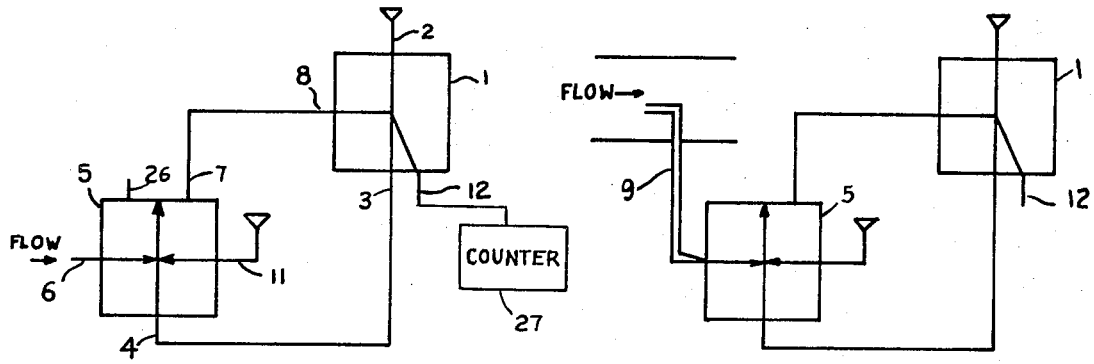
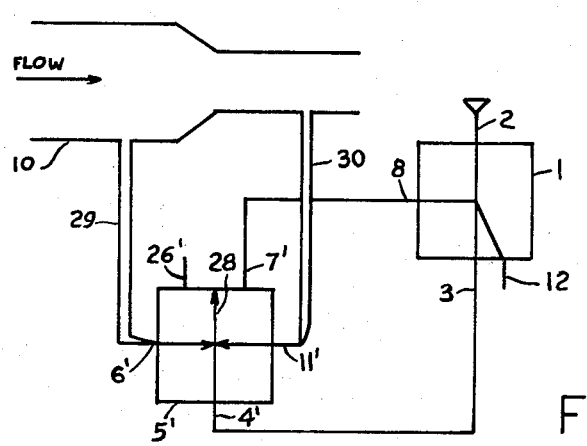
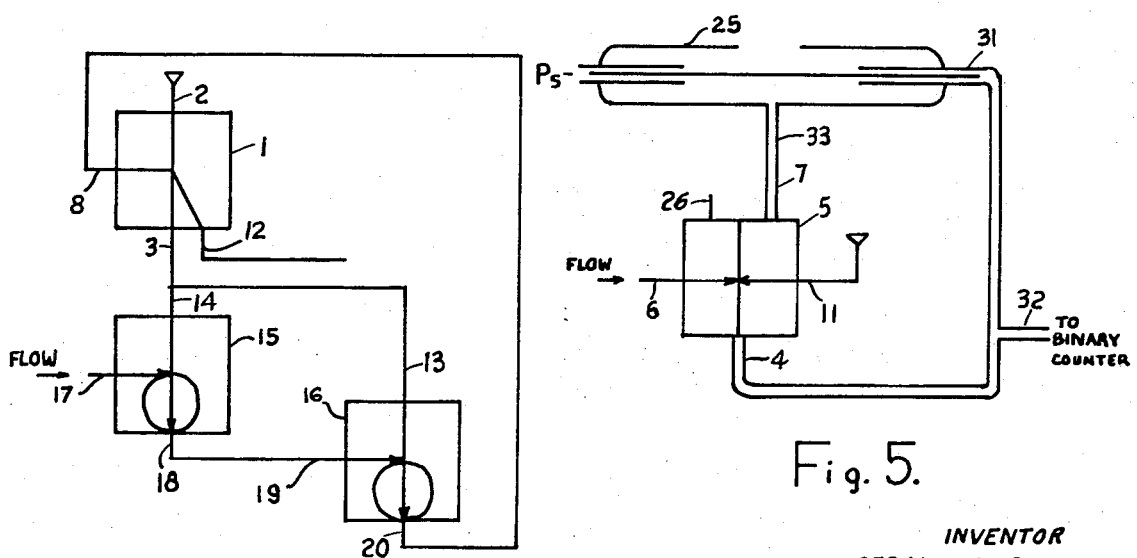

FLUIDIC DIGITAL PNEUMOTACHOMETER

THE PRIOR ART

This invention relates to devices for measuring fluid flow, and producing a digital indication of the rate of flow. More particularly, the present invention relates to flow measuring devices using only pure fluid circuit elements in a closed system to produce a digital indication of the rate of flow.

Fluidic flow rate sensors having no moving parts have been developed but each of these devices is open to the atmosphere and cannot be used to measure the flow of a volatile fluid without escape of fluid from the system.

Electronic devices now known are capable of producing a digital indication of flow rate. These devices employ temperature compensation of a hot wire, or convert the differential pressure measured in a Venturi tube to an electrical signal. Also known in the art are various moving-part spirometers whose volume is converted to an electrical signal. However, the prior art devices may be hazardous or unusable in an explosive environment. Thus, these prior art devices are dangerous when used to measure air flow in a coal mine, or are used to measure expiratory gases from a hospital patient who has been given a volatile anesthetic.

BRIEF DESCRIPTION OF THE INVENTION

An object of the present invention is to provide means for generating a digital indication of flow rate, said means being completely enclosed, having no moving parts, and requiring no electrical circuits, thereby making it admirably suitable for use in an explosive environment.

An object of the present invention is to provide means for measuring the pulmonary function of a patient, said means being completely enclosed and suitable for use on patients who have received a volatile anesthetic.

An object of this invention is to provide a pure fluid oscillator having a feedback path, and fluid amplifier means connected to the feedback path and responsive to the fluid flow being measured, to vary the RC time constant of the feedback path, whereby the frequency of oscillation of the fluid oscillator is proportional to the rate of flow being measured. A counter may be connected to the output of the oscillator to provide a digital indication of flow rate.

BRIEF DESCRIPTION OF THE DRAWINGS

FIG. 1 shows a preferred embodiment of the invention wherein full flow is applied to a porportional or jet deflection amplifier fluid disposed in the feedback path of a monstable NOR-type oscillator;

FIG. 2 shows an alternative embodiment wherein only a sample of the stream being measured is applied to a proportional fluid amplifier;

FIG. 3 shows a further embodiment wherein the differential pressure across a Venturi is applied to a proportional fluid amplifier;

FIG. 4 shows another embodiment where vortex amplifier means are employed in the feedback path of a monostable NOR-type oscillator; and, FIG. 5 shows a further embodiment wherein a turbulence amplifier is employed as the oscillator element.

DESCRIPTION OF PREFERRED EMBODIMENTS

The drawings and the following description conform to Military Standard Fluerics Terminology and Symbols (MIL-STD-1306).

As shown in FIG. 1, a preferred embodiment of the invention comprises a conventional NOR-OR gate 1 and a conventional jet deflection or proportional fluid amplifier 5. The NOR-OR gate has a power stream input port 2, a control port 8, a NOR output port 3, and an OR output port 12. The power stream input port is connected to a source of fluid under pressure and, in the absence of a signal at control port 8, the power stream exits from the gate through NOR port 3. The gate 1 is known in the art as a NOR gate because gates of this type frequently have more than one control port like control port 8. A signal at any one of the control ports deflects the power stream to the OR output port 12. These gates are conventionally of the wall attachment type such that if there is no input signal at any control port 8, the power stream flows directly to the NOR output port 3.

It is well known that a NOR gate such as gate 1 may be made to function as an oscillator by connecting NOR output port 3 through a feedback path including a fixed delay, to the control port 8. In accordance with the principles of the present invention, a fluid amplifier means is inserted in the feedback path to provide a delay characteristic that is variable in accordance with a flow rate being measured. In FIG. 1, the fluid amplifier means comprises the proportional fluid amplifier 5 having a power stream input port 4, first and second control ports 6 and 11, and first and second output ports 26 and 7.

The port 3 of NOR gate 1 is connected by a fluid conduit means to the power stream input port 4 of the amplifier 5. Output port 7 of the amplifier is connected by a second fluid conduit means to the control port 8 of the NOR gate. The fluid stream to be measured is applied to control port 6 of the amplifier 5, and a bias derived from a source of pressurized fluid is applied to the control port 11. The output port 26 may be returned in a conventional manner to the low pressure side of the source of pressurized fluid or, if fluid in the stream being measured in not volatile, port 26 may be vented to the atmosphere.

The embodiment of FIG. 1 functions as follows. The power stream applied to port 2 of NOR gate 1 flows out of the gate through port 3 and is applied to the power stream input port 4 of amplifier 5. Assuming that there is no flow being applied to control port 6, the bias signal at port 11 deflects the power stream of amplifier 5 so that it flows out of the amplifier through port 26. Since there is no flow out of port 7 to the NOR gate, the NOR gate never changes state. The power stream of the gate continues flowing to port 3 and no pulses are produced at port 12 to increment counter 27.

If there is any fluid flow into port 6, this flow deflects the power stream applied to the amplifier through port 4 so that a portion of the power stream is deflected toward port 7. The portion of the power stream directed toward port 7 is proportional to the magnitude of the flow signal applied to port 6.

The fluid flow into port 7 does not immediately affect NOR gate 1. The fluid conduit means connecting ports 7 and 8 has a certain resistance and capacitance. This resistance and capacitance causes a delay between the time a signal is applied to port 7 and the time the signal appears at port 8. As is well known in the art, this delay is caused because the input signal must "fill up" or pressurize the volume of the fluid conduit means before it can manifest itself at the port 8. Furthermore, the rate at which this volume is pressurized is dependent upon the magnitude of the signal appearing at port 7.

When the signal appears at port 8, it deflects the power stream of NOR gate 1 toward output port 12, thereby applying a fluid pulse to a counter 27. This pulse is applied to counter 27 as long as the signal exists at port 8.

At the time the power stream of the NOR gate is switched from port 3 to port 12, power stream flow through port 3 ceases. After a delay determined by the resistance and capacitance of the fluid conduit means connecting ports 3 and 4, the power stream at port 4 terminates. This, in turn, terminates flow into port 7. After a delay determined by the resistance and capacitance of the fluid conduit means connecting ports 7 and 8, the signal at port 8 terminates. At this time the power stream of the NOR gate 1 switches back so as to again flow out of the gate through port 3. This completes one cycle of operation of the oscillator, and during this cycle one fluid pulse has been applied to counter 27.

The oscillator will continue to oscillate, and during each cycle it will apply one pulse to the counter 27. The rate of oscillation will depend on the magnitude of the flow applied to port 6. Therefore, at the end of a predetermined interval, the count in counter 27 may be observed, and this count will be proportional to the flow during the measuring interval.

While the apparatus of FIG. 1 may be used in measuring either liquid or gaseous flow, it is admirably suited for, and has been tested, in the measurement of pulmonary function. The vital capacity was measured with the apparatus, and the flow was found to correlate well with the number of counts. The one-second forced vital capacity was also measured using a one-shot multivibrator to aid in collecting and storing the counts during this interval. The use of multivibrators as timing elements is well known in the art hence the timing element is not shown in the drawing.

The percentage of one-second forced vital capacity divided by the total vital capacity can be measured using the present invention and standard logic elements. Measurement of maximum breathing capacity over several seconds can be accomplished easily over this longer interval with rapid breathing.

In the embodiment of FIG. 1, the full flow being measured is applied to control port 6 of the amplifier 5. If desired, the flow may be sampled with a Pitot tube 9 as illustrated in FIG. 2, and the sample applied to the control port of the amplifier. Except for this difference, the embodiments of FIGS. 1 and 2 function in exactly the same way.

In the embodiment of FIG. 3, the amplifier 5' is of the center dump type, and the flow signal is applied to the amplifier as a differential pressure developed across a Venturi tube 10. Amplifier 5' has a power stream input port 4', first and second control ports 6' and 11', first and second output ports 7' and 26', and a center dump output port 28.

Ports 6' and 11' are connected across the Venturi by means of fluid conduit means 29 and 30. Ports 4' and 7' are connected to output port 3 and control port 8, respectively, of NOR gate 1. Ports 26' and 28 may be vented to the atmosphere, or connected to the low pressure side of the source of pressurized fluid.

In FIG. 3, the power stream of NOR gate 1 passes through ports 3 and 4', and exits through center port 28 as long as there is no fluid flow to cause a pressure differential across the Venturi. When there is a flow through the Venturi, the pressure in conduit 30 drops below the pressure in conduit 29. This pressure differential is applied across the power stream of amplifier 5' and deflects the power stream of the amplifier so that a portion of the power stream flows through port 7' to control port 8.

The operation of the embodiment of FIG. 3 from this point on is essentially the same as the embodiment of FIG. 1. The power stream of NOR gate 1 oscillates back and forth between ports 3 and 12. That portion of the power stream passing through port 3 is applied to amplifier 5' where it divides between ports 28 and 7'. The exact division is determined by the pressure differential across the Venturi, and the proportion flowing through port 7' determines the frequency at which NOR gate 1 oscillates. Thus, over a measured interval of time the number of pulses appearing at port 12 is proportional to the rate of flow through the Venturi.

From a comparison of FIGS. 1 and 3, it is obvious that amplifier 5 may be of the center dump type in which case there would be no need for applying a bias signal to the control port 11. Furthermore, an operational amplifier may be substituted for the standard proportional amplifier to achieve negligible hysteresis, low null shift and bias, and excellent frequency response and saturation characteristics.

It is also possible to replace the amplifier 5 of FIG. 1 with vortex amplifier means, and this embodiment is illustrated in FIG. 4. In this embodiment the port 3 of NOR gate 1 is connected to the power stream inputs 13 and 14 of two vortex amplifiers 15 and 16. Output port 18 of amplifier 15 is connected to the control port 19 of amplifier 16, and the output port 20 of amplifier 16 is connected to the control port 8 of the NOR gate 1.

The flow to be measured is applied to a control port 17 of amplifier 15 and both amplifiers 15 and 16 act as throttling valves with negative gain. Assume that the power stream exits from NOR-gate 1 through port 3 and is applied to ports 12 and 13. The output at port 18 will be inversely proportional to the magnitude of the flow applied to control port 17. The output at port 18 is applied to control port 19, and the output at port 20 is inversely proportional to the signal at port 19. Thus, the signal produced at port 20 is proportional to the flow being measured. The signal at port 20 is applied to the resistance-capacitance represented by the connecting conduit between ports 20 and 8 so that, after a delay interval, the power stream of NOR gate 1 switches from port 3 to port 12. The signal produced at port 12 is applied to a counting device, as in the previously described embodiments.

Termination of the signal at port 3 terminates the feedback signal through amplifiers 15 and 16 so that after a short interval the signal at port 8 terminates and the power stream in the NOR gate 1 switches back to port 3. As in the previously described embodiments, the rate at which NOR gate 1 oscillates is directly related to the flow applied to control port 17.

FIG. 5 shows an embodiment wherein the NOR gate is replaced by a turbulence amplifier 25 which functions as the oscillating element. The turbulence amplifier has a power stream input $P_s$ and an output port 31. The output port 31 is connected to the power stream input port 4 of a fluid amplifier 5. This amplifier may be of the same type as that shown in FIG. 1. The output port 7 of amplifier 5 is connected to the control port 33 of the turbulence amplifier.

The embodiment of FIG. 5 essentially functions in the same manner as the embodiment of FIG. 1. However, since the turbulence amplifier has only a single usable output port, a tap line 32 is provided to sense the output of the amplifier and drive a counter.

While the above described embodiments are all admirably suited for driving a pure fluid counter, it is contemplated that in some applications a fluid-to-electrical transducer may be provided to convert the fluid output signals to electrical signals suitable for driving an electronic counter.

In summary, the present invention provides a pure fluid oscillating element having a feedback path, delay means in the feedback path, and means responsive to a fluid flow for varying the delay, whereby the oscillating element oscillates at a rate proportional to the fluid flow. The device may be constructed of pure fluid components having no moving parts. It is simple, inexpensive to construct, and can be safely utilized in an explosive environment.

While several preferred embodiments of the invention have been described in detail, various substitutions and modifications falling within the spirit and scope of the invention as defined by the appended claims will be evident.

I claim:

1. Apparatus for measuring air flow comprising:
a fluidic OR/NOR oscillator including an OR output port, and a feedback loop connected between a NOR output port of the oscillator and a control port thereof;
a proportional fluid amplifier having a power stream input port connected to receive fluid from said feedback loop, an output port connected to supply fluid to said feedback loop, and a control port; and,
means for applying the flow to be measured to said control port of said proportional amplifier to thereby effectively vary the RC feedback and time constant of said oscillator, whereby a pulsed output is obtained at the OR output port of said oscillator at a frequency proportional to the flow being measured.

2. Apparatus for measuring fluid flow comprising: oscillator means including fluid amplifier means and a feedback path for applying a fluid signal produced at an output of said amplifier means to a control signal input of said amplifier means; and means in said feedback path and responsive to the fluid flow being measured for applying to said control signal input a portion of the fluid signal from said output that varies in proportion to the magnitude of the flow being measured, whereby said oscillator means oscillates at a frequency proportional to said fluid flow, said means in said feedback path including second fluid amplifier means having power stream input means, control signal input means, and first and second output means, said feedback path including first fluid conduit means connecting the output of said fluid amplifier means to said power stream input means and second fluid conduit means connecting said second output means to said control signal input, said fluid flow being applied to said control signal input means to direct a portion of the fluid from said power stream input means to said second output means.

3. Apparatus as claimed in claim 2 and further comprising counter means responsive to said oscillator means.

4. Apparatus as claimed in claim 2 wherein a Pitot tube is disposed to sample said fluid flow, the sample from said tube being applied to said control signal input means.

5. Apparatus as claimed in claim 2 wherein said second fluid amplifier means comprises two vortex amplifiers each having a power stream input connected to said first fluid conduit means, said fluid flow being applied to the control signal input means of the first vortex amplifier, said second fluid conduit means being connected to the second output means of said second vortex amplifier, and means connecting the second output means of said first vortex amplifier to the control signal input means of said second vortex amplifier.

6. Apparatus for measuring fluid flow comprising: oscillator means including fluid amplifier means and a feedback path for applying a fluid signal produced at an output of said amplifier means to a control signal input of said amplifier means; and means in said feedback path and responsive to the fluid flow being measured for applying to said control signal input a portion of the fluid signal from said output that varies in proportion to the magnitude of the flow being measured, whereby said oscillator means oscillates at a frequency proportional to said fluid flow, said means in said feedback path including a second fluid amplifier having a power stream input, first and second control inputs, and first and second outputs, said feedback path including a first fluid conduit means connecting the output of said fluid amplifier means to said power stream input and second fluid conduit means connecting said second output to the control signal input of said fluid amplifier means, said apparatus including a venturi through which the measured fluid flows, first and second sensing means for sensing the pressures upstream and downstream of said venturi, and means for applying said sensed pressures to said first and second control inputs.

7. Apparatus for measuring fluid flow comprising: oscillator means including fluid turbulence amplifier means and a feedback path for applying a fluid signal produced at an output of said amplifier means to a control signal input of said amplifier means; and means in said feedback path and responsive to the fluid flow being measured for applying to said control signal input a portion of the fluid signal from said output that varies in proportion to the magnitude of the flow being measured, whereby said oscillator means oscillates at a frequency proportional to said fluid flow.

8. Apparatus as claimed in claim 7 and further comprising counter means responsive to said oscillator means for counting the oscillations thereof over an interval of time.

* * * * *